(12) United States Patent
Kanenari

(10) Patent No.: US 11,865,877 B2
(45) Date of Patent: Jan. 9, 2024

(54) TIRE INFORMATION ACQUISITION DEVICE

(71) Applicant: The Yokohama Rubber Co., LTD., Tokyo (JP)

(72) Inventor: Daisuke Kanenari, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 767 days.

(21) Appl. No.: 16/981,678

(22) PCT Filed: Feb. 20, 2019

(86) PCT No.: PCT/JP2019/006288
§ 371 (c)(1),
(2) Date: Sep. 16, 2020

(87) PCT Pub. No.: WO2019/176485
PCT Pub. Date: Sep. 19, 2019

(65) Prior Publication Data
US 2021/0031573 A1    Feb. 4, 2021

(30) Foreign Application Priority Data
Mar. 16, 2018   (JP) .................................. 2018-049579

(51) Int. Cl.
*G08C 17/02*    (2006.01)
*B60C 23/04*    (2006.01)
*B60B 21/12*    (2006.01)

(52) U.S. Cl.
CPC ........ *B60C 23/04985* (2020.05); *G08C 17/02* (2013.01)

(58) Field of Classification Search
CPC ....... B60C 23/04; B60C 23/20; B60C 19/002; B60C 23/049; B60C 23/04985;
(Continued)

(56) References Cited

U.S. PATENT DOCUMENTS 6,899,153 B1 *   5/2005   Pollack ............... B60C 23/0408
                                                  156/110.1
7,350,407 B2     4/2008   Shimura
(Continued)

FOREIGN PATENT DOCUMENTS

DE    10 2010 037 597    3/2012
DE    10 2016 214 092    2/2018
(Continued)

OTHER PUBLICATIONS

International Search Report for International Application No. PCT/JP2019/006288 dated Mar. 26, 2019, 3 pages, Japan.

*Primary Examiner* — Brandi N Hopkins
(74) *Attorney, Agent, or Firm* — Thorpe North & Western

(57) ABSTRACT

A tire information acquisition device includes: a sensor unit including a sensor configured to acquire tire information; a sensor holder formed in a cylindrical shape holding the sensor unit, and composed of a non-metallic material having flexibility and air permeability; and a band having a band circumferential length adjustable by a fastening portion provided at one end and configured to reversibly fasten an other end, and the band is fastened to a rim in a state where the band is inserted into the sensor holder.

16 Claims, 5 Drawing Sheets

(58) Field of Classification Search
CPC ... B60C 23/0493; G01L 17/00; G01L 5/0019; G01M 17/02; G09F 21/043; G01G 19/12
See application file for complete search history.

(56) References Cited

U.S. PATENT DOCUMENTS

| | | | |
|---|---|---|---|
| 9,821,614 B1 * | 11/2017 | Brown | B60C 23/20 |
| 2005/0242937 A1 * | 11/2005 | Yokoi | B60C 19/00 340/447 |
| 2010/0238011 A1 * | 9/2010 | Carr | B60C 23/0408 340/442 |
| 2016/0129738 A1 | 5/2016 | Luce | |
| 2016/0229238 A1 | 8/2016 | Schwammlein et al. | |
| 2018/0029427 A1 | 2/2018 | Markert | |
| 2018/0029428 A1 | 2/2018 | Markert | |

FOREIGN PATENT DOCUMENTS

| | | |
|---|---|---|
| EP | 3 275 701 | 1/2018 |
| JP | H10-138702 | 5/1998 |
| JP | H10-315720 | 12/1998 |
| JP | 2004-314924 | 11/2004 |
| JP | 2007-055347 | 3/2007 |
| JP | 2016-104619 | 6/2016 |
| JP | 2016-538195 | 12/2016 |
| WO | WO 2004/000579 | 12/2003 |
| WO | WO 2015/055479 | 4/2015 |

* cited by examiner

TIRE INFORMATION ACQUISITION DEVICE

TECHNICAL FIELD

The present technology relates to a tire information acquisition device and particularly relates to a tire information acquisition device that offers low cost, is easy to install and applicable to various rim sizes.

BACKGROUND ART

To acquire tire internal information such as internal pressure and temperature, various sensors are installed in a tire inner cavity. A known method of installing such a sensor in a pneumatic tire includes a method of fixing a sensor to a rim by using a band (for example, see Japan Unexamined Patent Publication Nos. 2016-104619 and 2016-538195). However, since the band described in Japan Unexamined Patent Publication Nos. 2016-104619 and 2016-538195 has a specific length, the band includes no band structure that can accommodate both a tire for a passenger vehicle and a large tire such as for a truck, and there is a problem that the band is not widely applicable to various rim sizes.

Additionally, a known method of installing a sensor in a pneumatic tire includes a method of fixing a sensor to an end of a valve of a wheel. When the sensor is fixed to the valve in this way, there is an advantage that a position where the sensor is installed can be discriminated from the outside of a tire, and rim assembly is relatively easy. However, in the case of a tire for a truck, there are many kinds of valves, and a dedicated valve corresponding to each kind of valve is required, and thus this is not desirable from the perspective of product management and cost.

SUMMARY

The present technology provides a tire information acquisition device that provides low cost and is easy to install and that is applicable to various rim sizes.

A tire information acquisition device includes: a sensor unit including a sensor configured to acquire tire information; a sensor holder formed in a cylindrical shape holding the sensor unit, and composed of a non-metallic material having flexibility and air permeability; and a band having a band circumferential length adjustable by a fastening portion provided at one end and configured to reversibly fasten an other end, and the band is fastened to a rim in a state where the band is inserted into the sensor holder.

In an embodiment of the present technology, the tire information acquisition device includes: a sensor unit including a sensor configured to acquire tire information; a sensor holder formed in a cylindrical shape holding the sensor unit; and a band having a band circumferential length adjustable by a fastening portion provided at one end and configured to reversibly fasten an other end, and the band is fastened to a rim in a state where the band is inserted into the sensor holder. Accordingly, the tire information acquisition device does not include a complicated mechanism, and thus can be manufactured at low cost, and the sensor unit can be installed easily to the rim. Additionally, a band having a single size is applicable to various rim sizes. Further, the sensor holder is composed of a non-metallic material having flexibility and air permeability. Accordingly, air permeability of a ventilation hole provided in a surface of the sensor unit is ensured and radio waves transmitted by the sensor unit are not blocked.

In an embodiment of the present technology, the width of the band is preferably from 5 mm to 50 mm. The width of the band is appropriately set in this way, and thus it is possible to prevent a problem in use or in attaching the band.

In an embodiment of the present technology, preferably, the band length of the band in a state where the band is not attached to the rim is in a range of from 1800 mm to 2500 mm, and the other end of the band includes a structure capable of being cut. Accordingly, the band is widely applicable to various rim sizes from a tire for a passenger vehicle to a large tire such as for a truck. In particular, in a case where the band is left by a predetermined length in a region from the fastening portion to the other end when the band is cut, the same band can be used again when the sensor unit is replaced.

In an embodiment of the present technology, the band preferably has air permeability. Accordingly, even in a case where the band is disposed covering the ventilation hole of the sensor unit, the air permeability of the ventilation hole provided in the surface of the sensor unit can be ensured.

In an embodiment of the present technology, preferably, the sensor unit is disposed between the band and the rim. In this way, the sensor unit is disposed inward of the band in the tire radial direction, and thus the sensor unit can be fixed firmly to the rim.

In an embodiment of the present technology, preferably, the circumferential length of at least one opening of the sensor holder is from 120% to 200% of the circumferential length of the sensor unit as viewed from the direction in which the minimum projected area of the sensor unit is obtained, and the length in the extending direction of the sensor holder is from 150% to 500% of the maximum length of the sensor unit. Accordingly, since the holding function of the sensor holder for the sensor unit is sufficiently exhibited, the sensor unit can be attached easily to the rim while the displacement of the sensor unit is prevented.

In an embodiment of the present technology, preferably, the sensor holder is stretchable, and the circumferential length of at least one opening of the sensor holder is from 20% to 90% of the circumferential length of the sensor unit as viewed from the direction in which the minimum projected area of the sensor unit is obtained, and the length in the extending direction of the sensor holder is from 150% to 500% of the maximum length of the sensor unit. Accordingly, since the holding function of the sensor holder for the sensor unit is sufficiently exhibited, the sensor unit can be attached easily to the rim while the displacement of the sensor unit is prevented.

In an embodiment of the present technology, preferably, the sensor holder includes a fastening portion mechanically engageable, and the fastening portion is disposed in contact with the rim. Accordingly, the attachment work of the sensor holder is easy, and the sensor unit can be fixed firmly to the rim.

In an embodiment of the present technology, preferably, the band comprises a band body and the fastening portion, and at least a portion of the band body and the fastening portion in contact with the rim is made of a non-metallic material. When the portion of the band in contact with the rim is composed of a metal material, rust may be generated due to a difference in ionization tendency. On the other hand, in a case where the portion of the band in contact with the rim is composed of a non-metallic material, the occurrence of rust can be prevented.

DETAILED DESCRIPTION

Figure 1:
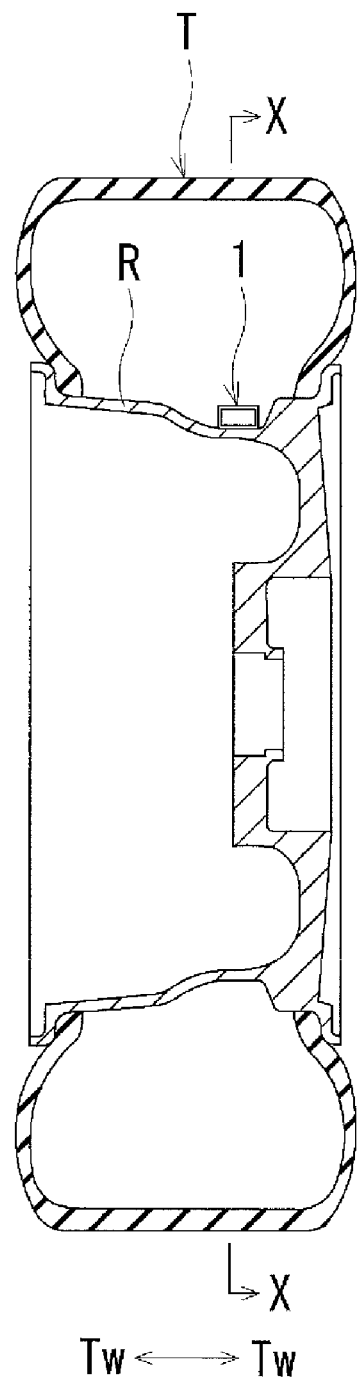
FIG. 1 is a cross-sectional view of a pneumatic tire on which a tire information acquisition device according to an embodiment of the present technology is mounted.
Figure 2:
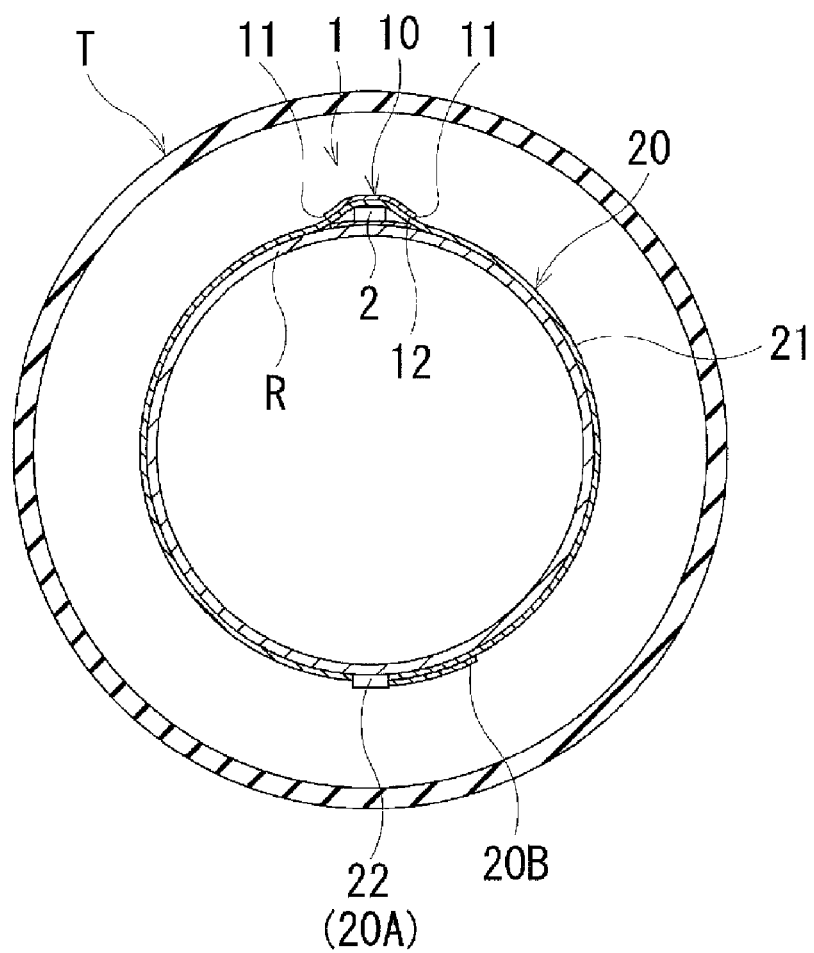
FIG. 2 is a cross-sectional view taken along line X-X of FIG. 1.
Figure 3:
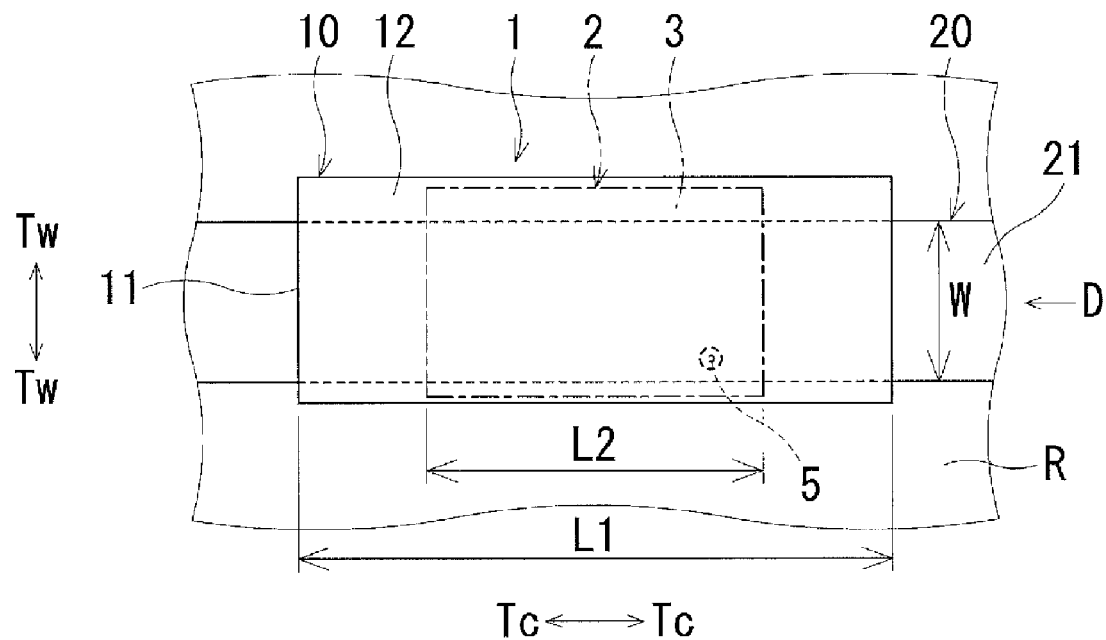
FIG. 3 is a plan view illustrating a tire information acquisition device according to an embodiment of the present technology.
Figure 4:
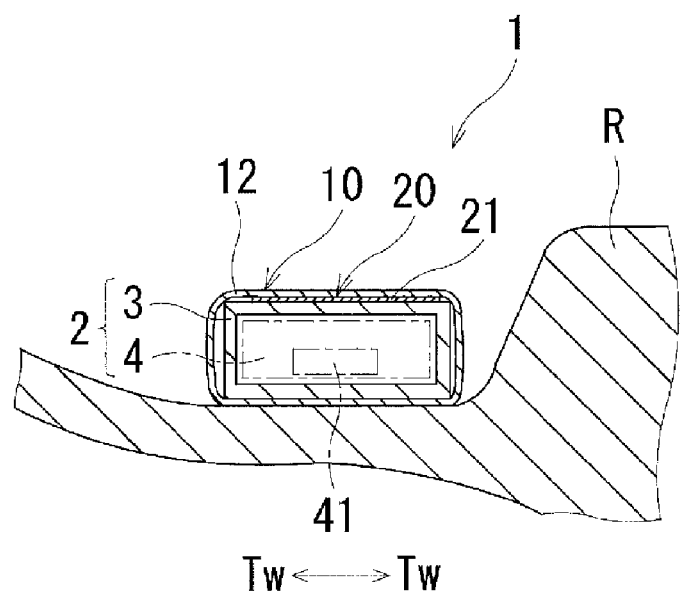
FIG. 4 is a cross-sectional view of a tire information acquisition device according to an embodiment of the present technology.
Figure 5:
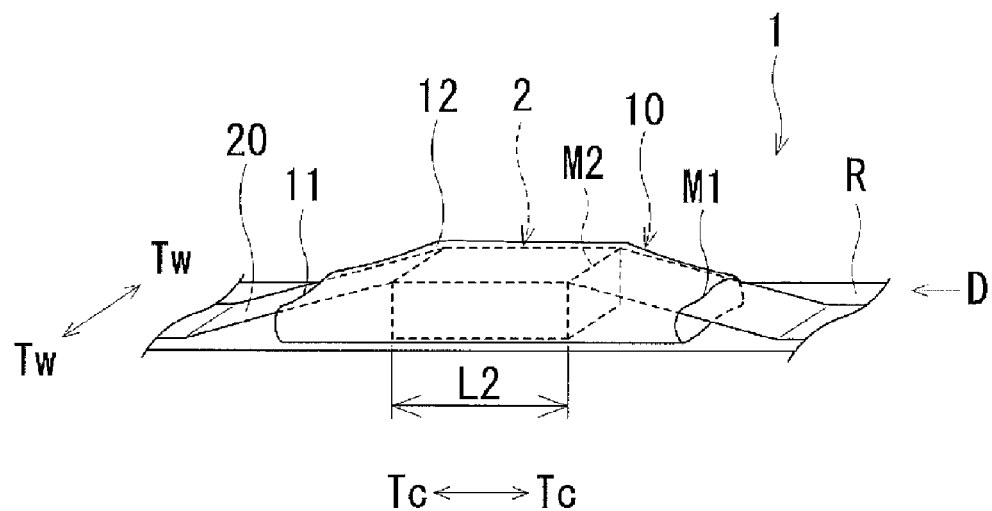
FIG. 5 is a perspective view illustrating a state where a sensor holder of a tire information acquisition device according to an embodiment of the present technology is fixed to a rim.

Hereinafter, the configuration of embodiments of the present technology will be described in detail with reference to the accompanying drawings. FIGS. 1 and 2 illustrate a pneumatic tire on which a tire information acquisition device according to an embodiment of the present technology is mounted. FIGS. 3 and 4 illustrate a tire information acquisition device according to an embodiment of the present technology. FIG. 5 illustrates a state where a sensor holder of a tire information acquisition device according to an embodiment of the present technology is fixed to a rim. Note that in FIG. 1 and FIGS. 3 to 5, arrow Tw indicates the tire lateral direction, and arrow Tc indicates the tire circumferential direction.

As illustrated in FIGS. 1 and 2, a tire inner cavity is formed between a pneumatic tire T and a rim R, and a tire information acquisition device 1 is mounted on the rim R in the tire inner cavity. The tire information acquisition device 1 is disposed in a well that is a flat portion of the rim R.

As illustrated in FIGS. 3 to 5, the tire information acquisition device 1 includes a sensor unit 2 that measures the state of the pneumatic tire T, a sensor holder 10 that holds the sensor unit 2, and a band 20 that fixes the sensor holder 10 to the rim R.

The sensor unit 2 includes a housing 3 and an electronic component 4. The housing 3 includes a hollow structure, and the electronic component 4 is housed inside of the housing 3. The housing 3 is provided with a ventilation hole 5 that ventilates air in the tire inner cavity. The electronic component 4 appropriately include a sensor 41 including a temperature sensor and a pressure sensor, a transmitter, a receiver, a control circuit, and a battery, or the like. Additionally, the sensor unit 2 is configured to transmit the internal temperature and internal pressure of the pneumatic tire T measured by the sensor 41 to the outside of the tire. The sensor unit 2 can be disposed outward of the band 20 in the tire radial direction in a state where the sensor unit 2 is housed in the sensor holder 10, but the sensor unit 2 is disposed inward of the band 20 in the tire radial direction (between the band 20 and the rim R) to firmly fix the sensor unit 2 to the rim R.

The sensor holder 10 is a cylindrical housing that houses the sensor unit 2. The structure of the sensor holder 10 is not particularly limited. A joining portion may be provided in a planar member, and the sensor holder 10 may be formed in a cylindrical shape through the joining portion, or the sensor holder 10 may be formed by using a cylindrical member including no joining portion. The sensor holder 10 includes a holder body 12, and the holder body 12 is composed of a non-metallic material. Such a sensor holder 10 includes the sensor unit 2, and thus has flexibility and air permeability. Additionally, the sensor holder 10 includes openings 11 on both sides in the extending direction of the sensor holder 10. The opening/closing state of the openings 11 is not particularly limited; however, in a case where the openings 11 are closed after the sensor holder 10 is attached to the rim R, the fall of the sensor unit 2 from the sensor holder 10 can be prevented.

The band 20 includes a band body 21 and a fastening portion 22. The fastening portion 22 is provided at one end 20A of the band 20, and reversibly fastens the other end 20B. Such a fastening structure is provided, and thus the band 20 can have the band circumferential length adjustable. The band 20 is fastened to the rim R in a state where the band 20 is inserted into the sensor holder 10.

When the sensor unit 2 is fixed to the rim R by using the sensor holder 10 and the band 20 described above, the band 20 is inserted into the sensor holder 10 having a cylindrical shape, and the sensor holder 10 is disposed at an intermediate position between the one end 20A and the other end 20B of the band 20. Then, the sensor unit 2 is disposed inward of the band 20 in the tire radial direction (between the band 20 and the rim R) and at a central portion in the extending direction of the sensor holder 10. Next, the other end 20B is inserted into the fastening portion 22 of the band 20 and fastened, and the sensor holder 10 is fixed to the rim R. In this case, in a region from the other end 20B of the band 20 to the fastening portion 22, the band may be cut being left by a predetermined length, or may be fixed by using a clip or the like of another member. In this way, the tire information acquisition device 1 can be fixed to the rim R. Note that although the sensor unit 2 is disposed inward of the band 20 in the tire radial direction in the above description, the sensor unit 2 can be disposed outward of the band 20 in the tire radial direction, and in this case, the sensor holder 10 holds the sensor unit 2.

The tire information acquisition device 1 described above includes: the sensor unit 2 including the sensor 41 configured to acquire tire information; the sensor holder 10 formed in a cylindrical shape holding the sensor unit 2; and the band 20 having the circumferential length adjustable by the fastening portion 22 provided at the one end 20A and configured to reversibly fasten the other end 20B, and the band 20 is fastened in a state where the band 20 is inserted into the sensor holder 10. Accordingly, the tire information acquisition device does not include a complicated mechanism, and thus can be manufactured at low cost, and the sensor unit 2 can be installed easily to the rim R. Additionally, the band 20 having a single size is applicable to various rim sizes. Further, the sensor holder 10 is composed of a non-metallic material having flexibility and air permeability. Accordingly, the air permeability of the ventilation hole 5 provided on the surface of the sensor unit 2 is ensured and radio waves transmitted by the sensor unit 2 are not blocked.

In the tire information acquisition device, a width W of the band 20 may be from 5 mm to 50 mm. The width W of the band 20 is appropriately set in this way, and thus it is possible to prevent a problem in use or in attaching the band 20. Here, when the width W of the band 20 is narrower than 5 mm, the sensor holder 10 may easily break when centrifugal force is applied to the sensor holder 10, and conversely when the width W of the band 20 is wider than 50 mm, the band 20 may not fit in the well of the rim R.

Additionally, preferably, the band length of the band 20 in a state where the band 20 is not attached to the rim R is in the range of from 1800 mm to 2500 mm, and the other end 20B of the band 20 includes a structure capable of being cut. "Structure capable of being cut" means a structure that can be cut by using a cutting tool such as scissors. Then, when there is a surplus portion except a predetermined length in the region from the fastening portion 22 to the other end 20B of the band 20 in a state where the tire information acquisition device 1 is mounted on the rim R, the surplus portion is cut. For example, when the band length is 2000 mm, the band is left by a predetermined length of from 100 mm to 150 mm in the region from the fastening portion 22 to the other end 20B, and the remaining portion is cut as the surplus portion. In particular, in a case where cloth is used as the band body 21 of the band 20 and the fastening portion 22 including a structure engageable with the cloth is provided at the one end 20A of the band 20, the band 20 can be cut by any band length and suitably the length can be adjusted in a stepless manner. The band length of the band 20 is appropriately set as described above, and thus the band 20 is widely applicable to various rim sizes from a tire for a passenger vehicle to a large tire such as for a truck. In particular, in a case where the band is left by a predetermined length in the region from the fastening portion 22 to the other end 20B when the band 20 is cut, the same band 20 can be used again when the sensor unit 2 is replaced.

Further, the band 20 preferably has air permeability. The band 20 has air permeability in this way, and thus even when the band 20 is disposed covering the ventilation hole 5 of the sensor unit 2, the air permeability of the ventilation hole 5 provided in the surface of the sensor unit 2 can be ensured.

In the tire information acquisition device, a length L1 in the extending direction of the sensor holder 10 is set longer than a maximum length L2 of the sensor unit 2, and may be set in the range of from 150% to 500% of the maximum length L2 of the sensor unit 2. Here, when the length L1 in the extending direction of the sensor holder 10 is smaller than 150% of the maximum length L2 of the sensor unit 2, there is a possibility that the sensor unit 2 fall off from the sensor holder 10 due to the rotation of a tire, and conversely when the length L1 is larger than 500%, this is undesirable from the perspective of mountability and cost. Note that the length L1 in the extending direction of the sensor holder 10 is a length in a state where the sensor holder 10 is not fastened to the rim R (simply placed on a plane).

A circumferential length M1 of at least one opening 11 of the sensor holder 10 is set to a dimension capable of housing the sensor unit 2 and the band 20, and may be set in the range of from 120% to 200% of a circumferential length M2 of the sensor unit 2 as viewed from a direction D in which the minimum projected area of the sensor unit 2 is obtained. As illustrated in FIG. 3, in the case of the sensor unit 2 that is rectangular in a plan view, the direction D in which the minimum projected area of the sensor unit 2 is obtained is the longitudinal direction of the sensor unit 2. Here, when the circumferential length M1 of the sensor holder 10 is smaller than 120% of the circumferential length M2 of the sensor unit 2, the sensor holder 10 cannot house the sensor unit 2, and when the circumferential length M1 is larger than 200%, the sensor unit 2 may be displaced when the sensor holder 10 is attached to the rim R.

Figure 6:
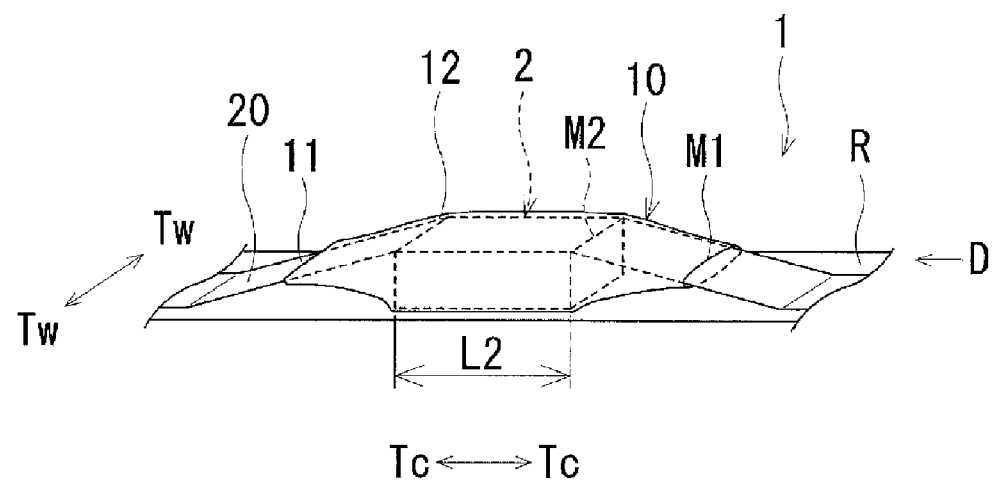
FIG. 6 is a perspective view illustrating a modification of a sensor holder of a tire information acquisition device according to an embodiment of the present technology.

FIG. 6 illustrates a modification of a sensor holder of a tire information acquisition device according to an embodiment of the present technology. A holder body 12 constituting a sensor holder 10 illustrated in FIG. 6 is stretchable. In a case where the sensor holder 10 is thus stretchable, a circumferential length M1 of at least one opening 11 may be set to 20% to 90% of a circumferential length M2 of a sensor unit 2 as viewed from a direction D in which the minimum projected area of the sensor unit 2 is obtained. Here, when the circumferential length M1 of the sensor holder 10 is smaller than 20% of the circumferential length M2 of the sensor unit 2, it is difficult to perform work for housing the sensor unit 2 in the sensor holder 10, and when the circumferential length M1 is larger than 90%, it is not possible to sufficiently ensure the holding function for the sensor unit 2.

As described above, the circumferential length M1 and a length L1 of the sensor holder 10 is appropriately set with respect to the circumferential length M2 and a maximum length L2 of the sensor unit 2, and thus the holding function of the sensor holder 10 for the sensor unit 2 is sufficiently exhibited. Accordingly, the sensor holder 10 can be attached easily to a rim R while preventing the displacement of the sensor unit 2.

Figure 7A:
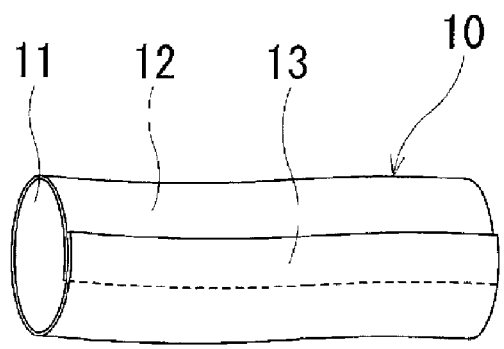
FIGS. 7A to 7C are perspective views illustrating another modification of a sensor holder of a tire information acquisition device according to an embodiment of the present technology.
Figure 7B:
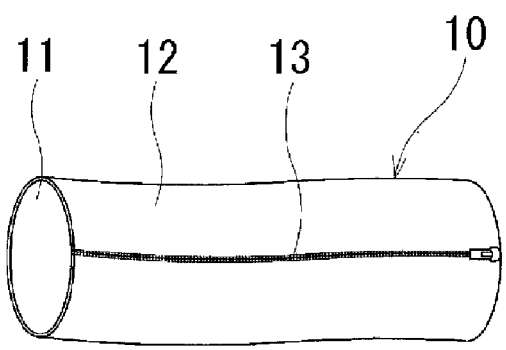
Figure 7C:
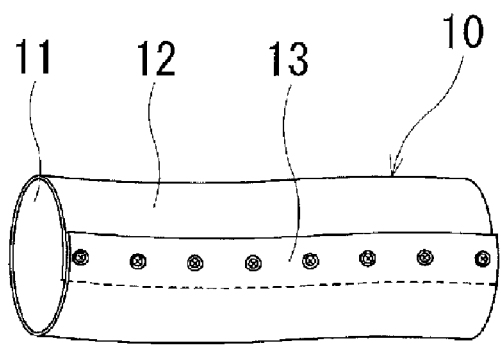

FIGS. 7A to 7C illustrate other modifications of a sensor holder of a tire information acquisition device according to an embodiment of the present technology. In FIGS. 7A to 7C, a sensor holder 10 includes a fastener portion 13 at each of both ends of a holder body 12 formed in a cylindrical shape. The fastener portion 13 is a fastener mechanically engageable, and a structure of the fastener portion 13 is not particularly limited. For example, a hook-and-loop fastener as illustrated in FIG. 7A, a slide fastener as illustrated in FIG. 7B, buttons, holes, and hooks as illustrated in FIG. 7C can be employed. In particular, it is desirable to use a hook-and-loop fastener as the fastener portion 13. Additionally, the fastener portion 13 is preferably composed of a non-metallic material to prevent damage to a rim R in addition to rust resistance. When the sensor holder 10 including the fastener portion 13 is fixed to the rim R, the sensor holder 10 is disposed such that the fastener portion 13 is in contact with the rim R. Since the fastener portion 13 is disposed in contact with the rim R in this way, the attachment work of the sensor holder 10 is easy, and the sensor unit 2 can be fixed firmly to the rim R.

In the tire information acquisition device described above, the band 20 comprises a band body 21 and the fastening portion 22, and at least a portion of the band body 21 and the fastening portion 22 in contact with the rim R is desirably made of a non-metallic material. Examples of a method of constituting the portion of the band 20 in contact with the rim R with a non-metallic material include: coating a surface of the band body 21 with a coating material made of a non-metallic material; bonding a non-metallic material to the surface of the band body 21; or inserting another member made of a non-metallic material between the band body 21 and the rim R. Examples of the non-metallic material include plastic, rubber, ceramic, and natural fiber, and particularly plastic is suitable. When the portion of the band 20 in contact with the rim R is composed of a metal material, rust may be generated due to a difference in ionization tendency. On the other hand, when the portion of the band 20 in contact with the rim R is composed of a non-metallic material, the occurrence of rust can be prevented.

Additionally, each of the sensor unit 2, the sensor holder 10, the band body 21, and the fastening portion 22 is preferably composed of a moldable material having relatively high heat resistance. Examples of the material having such physical properties include polypropylene, polyethylene and nylon.

The invention claimed is:

1. A tire information acquisition device, comprising:
   a sensor unit comprising a sensor configured to acquire tire information;
   a sensor holder formed in a cylindrical shape holding the sensor unit, and composed of a non-metallic material having flexibility and air permeability; and
   a band having a band circumferential length adjustable by a fastening portion provided at one end and configured to reversibly fasten an other end;
   the band being fastened to a rim in a state where the band is inserted into the sensor holder.

2. The tire information acquisition device according to claim 1, wherein a width of the band is from 5 mm to 50 mm.

3. The tire information acquisition device according to claim 2, wherein a band length of the band in a state where the band is not attached to the rim is in a range of from 1800 mm to 2500 mm, and the other end of the band comprises a structure capable of being cut.

4. The tire information acquisition device according to claim 3, wherein the sensor unit is disposed between the band and the rim.

5. The tire information acquisition device according to claim 4, wherein the band has air permeability.

6. The tire information acquisition device according to claim 5, wherein
   a circumferential length of at least one opening of the sensor holder is from 120% to 200% of a circumferential length of the sensor unit as viewed from a direction in which a minimum projected area of the sensor unit is obtained, and
   a length in an extending direction of the sensor holder is from 150% to 500% of a maximum length of the sensor unit.

7. The tire information acquisition device according to claim 5, wherein
   the sensor holder is stretchable,
   a circumferential length of at least one opening of the sensor holder is from 20% to 90% of a circumferential length of the sensor unit as viewed from a direction in which a minimum projected area of the sensor unit is obtained, and
   a length in an extending direction of the sensor holder is from 150% to 500% of a maximum length of the sensor unit.

8. The tire information acquisition device according to claim 5, wherein the sensor holder comprises a fastener portion mechanically engageable, and the fastener portion is disposed in contact with the rim.

9. The tire information acquisition device according to claim 8, wherein the band comprises a band body and the fastening portion, and at least a portion of the band body and the fastening portion in contact with the rim is made of a non-metallic material.

10. The tire information acquisition device according to claim 1, wherein a band length of the band in a state where the band is not attached to the rim is in a range of from 1800 mm to 2500 mm, and the other end of the band comprises a structure capable of being cut.

11. The tire information acquisition device according to claim 1, wherein the sensor unit is disposed between the band and the rim.

12. The tire information acquisition device according to claim 1, wherein the band has air permeability.

13. The tire information acquisition device according to claim 1, wherein
    a circumferential length of at least one opening of the sensor holder is from 120% to 200% of a circumferential length of the sensor unit as viewed from a direction in which a minimum projected area of the sensor unit is obtained, and
    a length in an extending direction of the sensor holder is from 150% to 500% of a maximum length of the sensor unit.

14. The tire information acquisition device according to claim 1, wherein
    the sensor holder is stretchable,
    a circumferential length of at least one opening of the sensor holder is from 20% to 90% of a circumferential length of the sensor unit as viewed from a direction in which a minimum projected area of the sensor unit is obtained, and
    a length in an extending direction of the sensor holder is from 150% to 500% of a maximum length of the sensor unit.

15. The tire information acquisition device according to claim 1, wherein the sensor holder comprises a fastener portion mechanically engageable, and the fastener portion is disposed in contact with the rim.

16. The tire information acquisition device according to claim 1, wherein the band comprises a band body and the fastening portion, and at least a portion of the band body and the fastening portion in contact with the rim is made of a non-metallic material.

* * * * *